US011310174B2

(12) United States Patent
Arzumanyan et al.

(10) Patent No.: US 11,310,174 B2
(45) Date of Patent: Apr. 19, 2022

(54) INTELLIGENT APPARATUS AND METHOD FOR RESPONDING TO TEXT MESSAGES

(71) Applicants: Andre Arzumanyan, Bedford, MA (US); David Arzumanyan, Bedford, MA (US); Rajesh Manika Ravindran, Kumbakonam (IN)

(72) Inventors: Andre Arzumanyan, Bedford, MA (US); David Arzumanyan, Bedford, MA (US); Rajesh Manika Ravindran, Kumbakonam (IN)

(73) Assignees: Andre Arzumanyan, Bedford, MA (US); David Arzumanvan, Bedford, MA (US)

( * ) Notice: Subject to any disclaimer, the term of this patent is extended or adjusted under 35 U.S.C. 154(b) by 0 days.

(21) Appl. No.: 16/990,814

(22) Filed: Aug. 11, 2020

(65) Prior Publication Data
US 2020/0374246 A1    Nov. 26, 2020

Related U.S. Application Data

(63) Continuation of application No. 15/947,084, filed on Apr. 6, 2018, now Pat. No. 10,778,614.

(30) Foreign Application Priority Data

Mar. 8, 2018    (IN) .............................. 201841008520

(51) Int. Cl.
*H04L 51/02*    (2022.01)
*H04M 7/12*    (2006.01)
(Continued)

(52) U.S. Cl.
CPC ......... *H04L 51/02* (2013.01); *G06Q 20/3255* (2013.01); *H04L 51/06* (2013.01);
(Continued)

(58) Field of Classification Search
CPC .. H04M 3/493; H04M 3/5166; H04M 3/4936; H04M 7/0042; H04M 7/125;
(Continued)

(56) References Cited

U.S. PATENT DOCUMENTS 7,720,784 B1    5/2010  Froloff
8,254,535 B1    8/2012  Madhavapeddi et al.
(Continued)

FOREIGN PATENT DOCUMENTS

WO    WO 2010/029427 A1    3/2010

OTHER PUBLICATIONS

"Factors Influencing Citizen Adoption of SMS-Based e-Government Services", Electronic Journal of e-Government, vol. 8, Issue 1, pp. 55-71, Mar. 2010.
(Continued)

*Primary Examiner* — Rasha S Al Aubaidi
(74) *Attorney, Agent, or Firm* — Sunstein LLP

(57) ABSTRACT

An intelligent interface responds to text messages, which in a particular embodiment are addressed to a landline phone number. An IP network interface receives requests including a source phone number, message content and the destination phone number. The intelligent interface includes access to a serialized intent file created by a vectorizer. An intent classifier determines one intent from the serialized intent file based on the received message content. A response is generated according to the one intent. A reply generator generates a reply including the source phone number as a destination, the landline phone number as a source and the response.

18 Claims, 6 Drawing Sheets

(51) Int. Cl.
*G06Q 20/32* (2012.01)
*H04L 51/06* (2022.01)
*H04M 7/00* (2006.01)

(52) U.S. Cl.
CPC ......... *H04M 7/0042* (2013.01); *H04M 7/125* (2013.01); *H04M 7/128* (2013.01)

(58) Field of Classification Search
CPC ........ H04M 7/128; H04L 51/02; H04L 51/06; G06Q 20/3255
See application file for complete search history.

(56) References Cited

U.S. PATENT DOCUMENTS

| | | |
|---|---|---|
| 8,255,291 B1 | 8/2012 | Nair |
| 8,407,212 B2 | 3/2013 | Tzvi et al. |
| 8,718,239 B1 | 5/2014 | Madhavapeddi et al. |
| 8,775,260 B1 | 7/2014 | Pienkos |
| 8,954,349 B2 | 2/2015 | Tolcher |
| 9,020,107 B2 | 4/2015 | Madhavapeddi et al. |
| 9,143,881 B2 | 9/2015 | Fan et al. |
| 9,147,212 B2 | 9/2015 | Pettyjohn et al. |
| 9,185,215 B2 | 11/2015 | Madhavapeddi et al. |
| 9,189,742 B2 | 11/2015 | London |
| 9,251,508 B2 | 2/2016 | Bishop |
| 9,271,129 B2 | 2/2016 | Lew et al. |
| 9,420,437 B2 | 8/2016 | Johnston et al. |
| 9,465,864 B2 | 10/2016 | Hu et al. |
| 9,553,997 B2 | 1/2017 | Sharma et al. |
| 9,596,350 B1 | 3/2017 | Dymshyts et al. |
| 9,626,446 B2 | 4/2017 | Burris |
| 9,674,372 B2 | 6/2017 | Karnas et al. |
| 9,754,176 B2 | 9/2017 | Kostyukov |
| 9,779,356 B2 | 10/2017 | Driscoll |
| 10,484,535 B2 | 11/2019 | Garfinkel |
| 2008/0071544 A1 | 3/2008 | Beaufays et al. |
| 2013/0165086 A1 | 6/2013 | Doulton |
| 2014/0280267 A1 | 9/2014 | Perlegos |
| 2015/0281166 A1 | 10/2015 | Woo et al. |
| 2017/0161393 A1 | 6/2017 | Oh et al. |
| 2018/0336266 A1 | 11/2018 | Chen et al. |

OTHER PUBLICATIONS

"Text Appointments Overview", TimeTrade, https://www.timetrade.com/resource/interactive-text-demo/, 5 pages, 2018.

INTELLIGENT APPARATUS AND METHOD FOR RESPONDING TO TEXT MESSAGES

CROSS REFERENCE TO RELATED APPLICATIONS

This application is a continuation of U.S. application Ser. No. 15/947,084, filed Apr. 6, 2018, which claims the benefit of Indian Provisional Patent Application No. 201841008520, filed Mar. 8, 2018, titled "Intelligent Apparatus and Method for Responding to Text Messages." The entire contents of these applications are hereby incorporated by reference herein, for all purposes.

TECHNICAL FIELD

The present invention relates to customer communication technology and, more particularly, to artificial intelligence assistants.

BACKGROUND ART

Retail establishments have numerous technologies at their disposal for improving the customer experience. U.S. Pat. No. 8,775,260 discloses user interfaces fixed within a store where a user can inquire about the location of a product and receive a response indicating the product's location. U.S. Pat. No. 9,147,212 discloses a mobile phone system in which a user makes a voice call to an automated voice response system that can provide a product location in response to a voice inquiry. U.S. Pat. No. 9,754,176 teaches a method of extracting data from a document such as a sales receipt. Photographs of receipts taken by a smartphone may be used to support customer loyalty programs. Timetrade advertises an ability to schedule appointments through text messaging.

While a retail establishment can expend its resources to build out any one or more of the available services, it involves a tremendous commitment. Reaching customers through various combinations of apps, voice calls, kiosks and texting services may serve to be confusing and counterproductive.

SUMMARY OF THE EMBODIMENTS

In accordance with one embodiment of the invention, an intelligent interface includes an IP network interface associated with a phone number. Requests received, in which the phone number is a destination phone number, will also include a source phone number and message content. A reply generator in the intelligent interface generates a reply wherein the source phone number is used as the destination and the destination phone number is the source. The ability to respond to the message content is made possible with a first vectorizer that generates a serialized intent file and stores the file in memory. An intent classifier determines, based on the message content, one intent from the serialized intent file. A response generator is responsive to the one intent for producing a response. The response is provided in the reply.

According to one embodiment, the IP network interface is associated with a landline phone number. Embodiments may further include a gateway in communication with a cellular network and the IP network. The gateway is configured to convert cellular network communications to IP network communications and IP network communications to cellular network communications.

Embodiments may further include a second vectorizer in communication with a collection of intent object attributes. The second vectorizer is configured to create a serialized intent object file. The response generator has access to the serialized intent object file to assist with generating responses.

In a particular embodiment, the intent classifier is responsive to message content including a purchase receipt image to determine an intent corresponding to a loyalty program. In an additional particular embodiment, one of the intents in the serialized intent file is a product locator program.

According to a method embodiment of the invention, a serialized intent file having a plurality of intents is provided. A request including a source phone number, a destination phone number and message content is received from over an IP network. Based on the message content, an intent from the plurality of intents is determined. In accordance with a program corresponding to the intent, response message content gets generated. A reply including the source phone number as a destination, the destination phone number as a source and the response message content is transmitted over the IP network.

Intents may correspond to programs leading to any of a variety of operations. The program may be an app. The program may lead to retrieving a resource. The resource may be any of a variety of types. The resource may be a link to a web application or a link to a web page. According to a further alternative, the resource may be a uniform resource identifier for launching an app or utility on a mobile communication device. A further program type is a predefined response script.

Additional steps may typically be performed by a gateway. A text message received over a cellular network is converted to the request sent over the IP network. In the other direction, the reply is received over the IP network and the response message content is forwarded in a text message to the destination.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

A "text message" as used herein includes SMS messages and MMS messages.

The term "memory" as used herein includes all media in a system that can be used to store data including nonvolatile storage, volatile storage, ROM, disk, solid state memory, RAM, internal storage and external storage.

Figure 1:
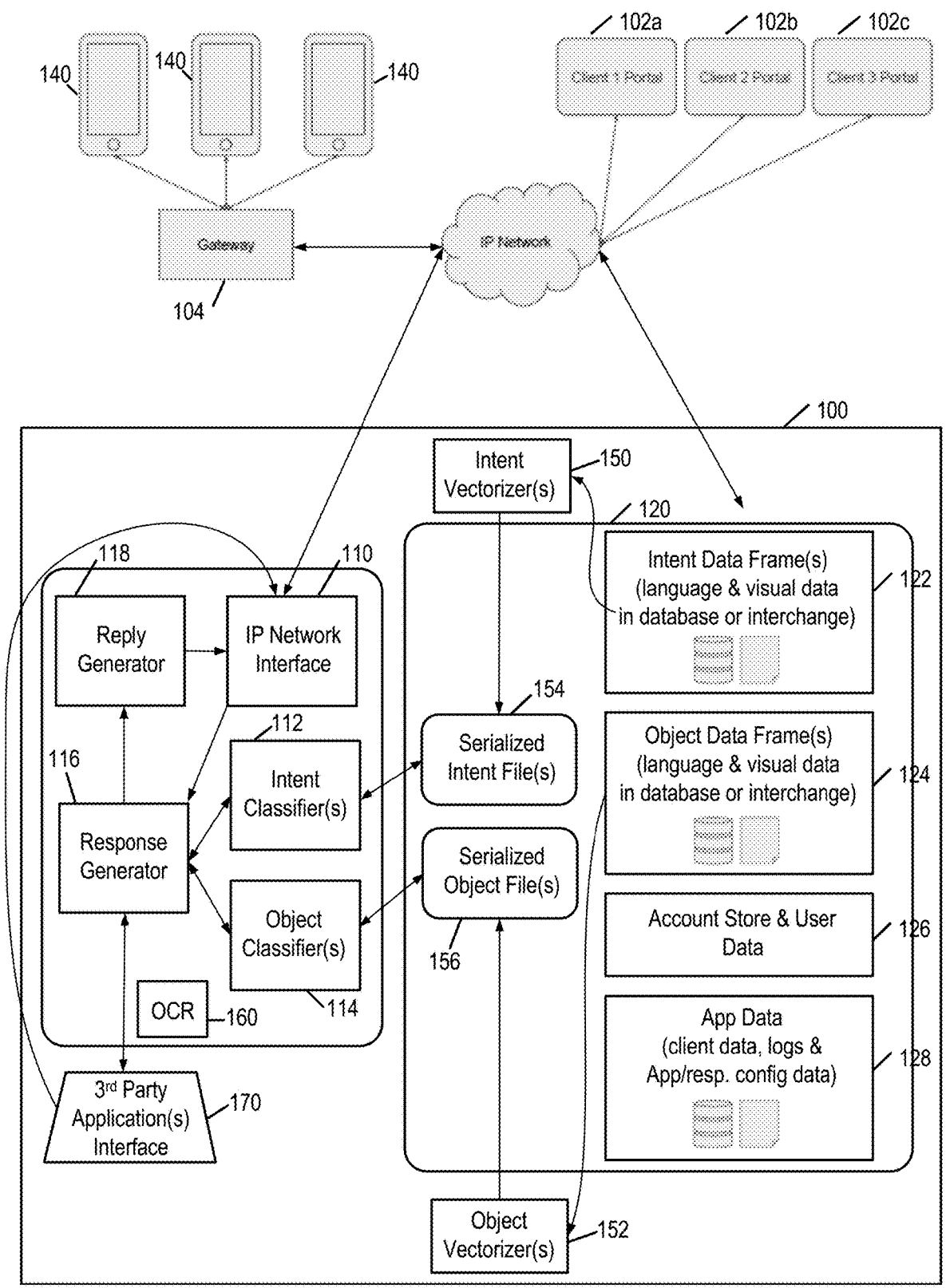
FIG. 1 is a block diagram illustrating a system including an intelligent interface of the present invention.

FIG. 1 illustrates an intelligent interface 100 of the present invention configured to provide any of a variety of services for any of a number of clients to the users of text messaging devices. The intelligent interface 100 may be built on one or more server systems. Clients may include retail stores, restaurants, insurance brokers, real estate brokers, or any service providers who wish to improve communications with customers or users of their service. Each client has one or more phone numbers for receiving text messages to be handled by the intelligent interface 100. In accordance with a particularly advantageous embodiment of the present invention, the phone number may be a landline phone number for the client establishment. By using the landline phone number, the establishment benefits from using a number that has been long associated with the establishment and may be located in a number of phone directories and on websites. The intelligent interface 100 thus leverages the value and extends the technical reach of a communication channel already associated with the establishment.

Each client has a portal 102*a,b,c* through which it can communicate with the intelligent interface 100 over the IP network. Through the portal, the client can set up selected services to be made available to users of its phone numbers. Services may include any of a predefined scripted response, resource responses and interactive app responses. The client can make a customized service available by providing the intelligent interface 100 with data corresponding to the establishment. Some exemplary data frames that an establishment might provide include a data frame listing all of the products and their location on store shelves, a data frame listing all cars for sale on a lot, or a data frame listing all menu items and their prices.

The various available services are stored in an intents catalog 122 in the memory 120 associated with the intelligent interface 100. When receiving a request originating from a text message device, the intelligent interface identifies the service from among those available to the called client which most closely matches the intentions of the requester. Thus, the services are called intents. For example, intents may be directed to helping a user with locating a product, navigating a loyalty program, making a reservation, seeking a job, learning about events, organizing a shopping list, navigating the available intents, answering a common question, providing feedback to an establishment, ordering or using gift cards, receiving a targeted discount offer and getting help with the intelligent interface. Other intents may be added to the intents catalog as they are developed. The intelligent interface 100 advantageously provides a wide variety of services that its clients can make available to their customers or users.

The intents catalog 122 includes the intents and a compilation of language and visual data indicative of a request for that intent. The compilation can be manually generated. The compilation can be supplemented by information provided by the client.

Some intents may make use of additional information in a request, for the purpose of identifying objects that particularize the request. For example, in selecting an item from a menu the request may use language recognizable but not identical to the language on the menu. An objects catalog 124 includes the objects relevant to an intent and a compilation of language and visual data indicative of each object. Objects data frames may be populated with data provided by a client. A client may provide databases or files related to the services being provided to that client on the intelligent interface. For example, a listing of all products, their classification and their location when the product locator service is being made available should be provided by the client. Similarly, a restaurant client would provide a listing of all menu items to facilitate a meal ordering service. Many other examples are possible such as a listing of properties available for sale on behalf of a real estate broker establishment or a listing of vehicles for sale at an auto dealership.

The object data frames may be stored in a response configuration database or interchange data frame format. Thus, the object data frame may reside in a relational database dedicated to response configuration relationships. The object data frames are more broadly defined to include generic (interchange format) data frame files. The intelligent interface provider will need to administer the system. Client accounts are maintained requiring storage of account and user information, identity of selected services and usage data. Use of the various services may be monitored permitting the administrator to offer clients useful reports regarding their customer and user habits. The administration data is stored in the Account, Store and User Data database 126.

User sessions are tracked in the intelligent interface 100. A log of the requests and replies is maintained at least while the session remains active. App Data 128 corresponds to the app data and logs stored in memory 120. This includes working memory for various processes being performed to support an app or script as it is running. The app data 128 includes logs of request and reply sessions with users. Sessions remain active until they are completed or timed out. Inactive session data may be stored in an archive. Memory 120 also maintains data related to each of the clients including the services that have been selected and logs of communications with each client.

Each intent in the intents catalog 122 is associated with a program for responding to requests. The program is stored in memory 120 and may be considered as part of the app data 128. The intelligent interface 100 can advantageously offer different types of interactive services for association with any of the intents. One type of service is a predefined response script. The predefined response script merely produces a response to the request. For example, a "goodbye" intent may be programmed with a script that provides a suitable signoff response. A general information request intent may be programmed to provide an informational response with details as to address, phone, store hours, website and the like.

Another service that can be made available through the intelligent interface 100 is an application or "app". An app is a program that interacts with the user through a series of queries and responses to perform a group of coordinated functions, tasks, or activities for the benefit of the user. The app may be built into the intelligent interface 100 or it may be created or customized by a client through its client portal. The apps may be stored among the app data frames 128 for access in response to customer or user requests.

When an unspecific greeting such as "hello" is the essence of the request, the "request opening app" intent may be activated to provide the user with a greeting and an explanatory screen to help the user select a particularly relevant and useful intent. A "help" intent may be programmed with an app that provides an options menu in response. The user responds with a selection to launch the indicated intent from the options menu.

Other intents may be associated with programs that retrieve a resource. The available resources offer different types of services. One type launches an app or a utility on the customer or user's text messaging device 140. A typical text messaging device 140 is a mobile smartphone. To launch an app or utility on a smartphone, the intelligent interface replies by sending along a uniform resource identifier ("URI") internal to the phone for the specified app. The URI may be particular to the intent for the particular client. Thus, for example, the link may not only open an app on the text messaging device 140, but it may more specifically open a response page to a request embedded in the URI. The app data database 130 contains a message to go with the uniform resource identifier, so that the customer or user understands to click on the link upon receiving it in the text message.

Another type of service may be provided through a web application. The resource for the application is a link to the web application. The link is a URL that is fed to the browser on the smartphone when the user activates the link. Typically, links are activated by touching them with a finger or stylus. The user can then interact with the web application to obtain requested information or instructions or perform functions, tasks or activities associated with the application for the benefit of the user.

Another service may simply be a web page. The resource for the web page is a link to the web page. The link is a URL that is fed to the browser on the smartphone when the user activates the link. The web page may provide information helpful to the requesting user. For example, the page may provide a product description or a store map. With the intelligent interface 100, a client can set up desired services in association with specified intents to satisfy the needs of its customers and users.

Customers and users are advantageously able to access the services of a particular client through text messages to the intelligent interface 100. A gateway 104 is provided with the phone numbers designated by the clients for text message access by its customers or users. The gateway 104 intercepts text messages sent over a cellular network to any of the designated phone numbers. The designated phone number may be a cellphone number or a landline phone number, so long as it registered with the gateway in connection with the intelligent interface. When the gateway 104 receives a text message, it embeds the message in an HTTP request addressed to the intelligent interface 100. The HTTP request is sent out over the Internet Protocol network 106. There are a number of gateway providers who may provide the gateway function required by embodiments of the present invention. For example, Twilio, Inc. of San Francisco, Calif. offers such a gateway service.

The intelligent interface 100 receives the HTTP requests through its IP network interface 110. The request includes as a destination phone number, the phone number designated by one of the clients. The request further includes a source phone number and message content. The source phone number identifies the text messaging device user.

In order to be responsive to natural language inputs, the ability to interpret the request is critical. Successful operation of the intelligent interface 100 depends on converting the intents catalog and the objects data frames into serialized files. The conversion is performed by intent vectorizer 150 and object vectorizer 152. Vectorizers are known in the art. Any of the vectorizers used in the present invention may a single vectorizer or an ensemble of vectorizers, in either case they are referred to herein as a vectorizer. A vectorizer associates each intent or object with a series of numbers each number giving a strength of relationship with one of a plurality of different words, phrases or images. A Bag of Words model is one approach to generating the relationships for vectorization. The model is applicable to images as well as words. By providing the vectorizer with numerous sample word or image inquiries representative of a particular intent, a vector associated with an intent can be generated for use in analyzing and classifying requests from users. In similar fashion, the object vectorizer generates a vector for an object. An example of a vectorizer is the TfidfVectorizer available online from scikit-learn.org. The TfidfVectorizer is equivalent to scikit's CountVectorizer followed by TfidfTransformer.

Building a serialized intent file for an intent classifier shall now be explained according to one particular embodiment. Intent data can be prepared in a JSON format where key is the intent and value is the list of keywords or phrases related to the intent. The JSON formatted data is loaded into a pandas.dataframe. The data frames are stored in the intents catalog 122. Training documents with sample text messages which can include any combination of textual and/or image messages are converted to vectors by a vectorizer. In advance of the vectorizer, a stemmer may be used to simplify the contents of a textual message. For example, an nitk.stemmer may be used. Further simplification can include removing or filtering out stop words. According to the TfidfVectorizer, the vectorizer may use an in-memory vocabulary (a Python dict) to map the most frequent words to features indices and hence compute a word occurrence frequency (sparse) matrix. The word frequencies are then reweighted using the Inverse Document Frequency (IDF) vector collected feature-wise over the corpus of training documents. Classification is based on the k-NN algorithm for the model developed by the training documents.

Upon vectorizing the intents and the objects, they are saved in memory in a serialized intent file 154 and serialized object file 156, respectively. For Python users, such files may be known as pickle files. The IP network interface 110 receives the HTTP request and it is passed to the response generator 116 which examines the source telephone number provided with the HTTP request. If an active session is in progress with that source for the client designated by the destination phone number, the response generator 116 returns to the program for the intent that is in progress and generates a next response in view of the program and the message received in the HTTP request. New requests, however, are first analyzed by an intent classifier 112.

The intent classifier 112 compares the request with the serialized intent file to determine an intent most closely related to the request. According to some embodiments, the model characterized by the serialized intent file uses a two dimensional plane. One axis is the intents and the other axis is the vectorized representations of the document. Each trained document is a point on the plane. The classifier may rely upon any of a number of known approaches including but not limited to generalized linear models, support vector machines, nearest neighbors, decision trees and neural networks. In a preferred embodiment, the intent classifier 112 vectorizes the request in a fashion similar to that used on the training documents and runs a nearest neighbor algorithm comparison between the request vector and those in the serialized intent file. The nearest neighbor vector identifies the intent that will be used for responding to the request. In preferred embodiments, the k-NN algorithm uses the Minkowski distance to determine the distance from the vector being classified and the other vectors on the plane. The closest vector is picked and its intent is selected.

Some intents have programs which are responsive to objects in the request. These programs will engage an object classifier 114 to identify an object in the request. The object classifier 114 can work in the same manner as the intent classifier. The classifier may rely upon any of a number of known approaches including but not limited to generalized linear models, support vector machines, nearest neighbors, decision trees and neural networks. The object classifier 114 can vectorize object attributes in the request. Vectorization may include parsing into parts of speech, extracting nouns or verbs and matching to stored object data. In a preferred embodiment, the object classifier determines the nearest match, by running a nearest neighbor algorithm comparison between the vectorized object attributes in the request and the vectors in the serialized object file. The nearest neighbor identifies the object that will be used in the program of the intent.

The response generator 116 determines the response to be sent back in a reply. The intent determines the applicable program to be followed by the response generator for determining the response. The response may be a predefined response from a script or may be a resource leading to any of a plurality of possible type services. For scripts, the response generator follows commands and provides responses according to the script stored with the app data 128 in memory 120. For in-progress requests received by the IP Network interface 110, the response generator reviews the state of the script in its log among the app data 128 and generates a next response in accordance with the script. For new requests, the indicated script is accessed and a response is generated as specified in the script.

With respect to resource responses, the program associated with the intent provides a suitable response message, which will include a link or a uniform resource identifier. The link may direct the user to a web page or a web application. The uniform resource identifier launches an app or utility program on the user's mobile communication device, typically a smartphone.

The generated response is ready for packaging into an IP network communication. Reply generator 118 completes the communication. The source phone number from the original HTTP request becomes the destination for the reply. The destination phone number from the original HTTP request becomes the source in the reply. The response and the phone numbers will constitute the text message sent to the user's text messaging device. The reply generator, thus advantageously, extends the technical reach of the intelligent interface 100 to text-messaging devices 140. In the IP network interface, the text message is appended to an IP packet addressed to the IP address of gateway 104. The IP packet is sent out by the IP network interface 110 over the IP network 106 where it is routed to the gateway 104. Gateway 104 extracts the text message and sends it over the cellular network to the requesting user.

The intelligent interface 100 advantageously makes numerous intents available to its clients. Some of these services may be existing services available online, which are now being made available through the unique text messaging interface incorporated into the intelligent interface 100. The inventors have also developed new services for access through the intelligent interface 100.

Figure 2:
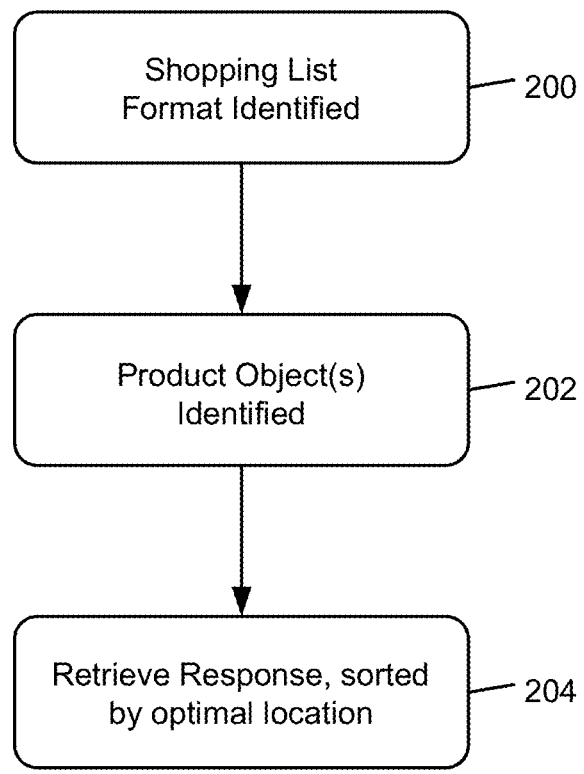
FIG. 2 is a flowchart of a program corresponding to a shopping list intent for use in the intelligent interface of FIG. 1.

As shown in FIG. 2, a shopping list app may be associated with an intent. When a request supplies a list of items purchasable in the client establishment, the intent classifier 112 may determine that the shopping list intent is being requested 200. The shopping list intent is associated with a program that calls upon the object classifier 114. The object classifier 114 associates each item in the list with the closest item in the client establishment's object data 202. For each object classified in the list, the program identifies the product location in the object data for the client. The shopping list can then be sorted according to product location and returned to the user in one or more responsive text messages thereby providing the user with an ordered shopping list 204. For added convenience, the program may include each product's location when responding with the sorted list. A shopper can thus conveniently text his or her shopping list to the establishment's phone number and receive back a sorted list conveniently arranged by location.

Figure 3:
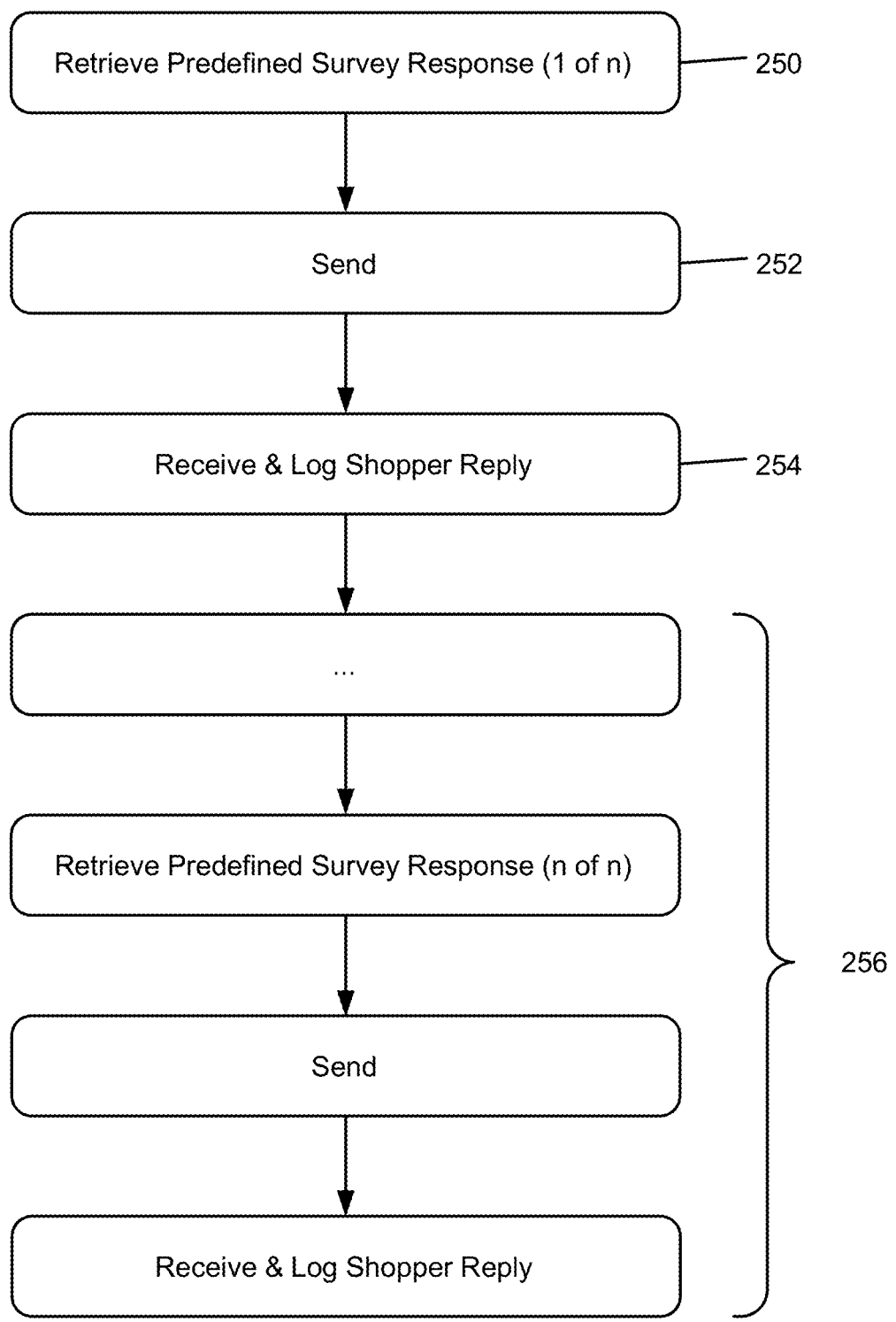
FIG. 3 is a flowchart of a program corresponding to a consumer survey intent for use in the intelligent interface of FIG. 1.

The intelligent interface 100 further provides a convenient means for collecting feedback from customers. Referring now to FIG. 3, a customer at anytime during or after shopping or dining at an establishment can seek to provide unstructured feedback or fill out a survey to report on his or her experience. The survey is readily accessed through the customer's handy text messaging device 140. Upon recognizing the user's intent is to provide feedback or respond to a survey, the feedback or survey app for the particular client is accessed 250. For unstructured feedback, the program analyzes the customer's message and extracts the relevant topics covered for later analysis and presentation to the merchant. Having extracted the topics covered in the feedback, the intelligent interface can generate a specific response to the customer acknowledging their specific feedback topics. For surveys, a question is sent in a reply text to the user 252. An HTTP request text from the user is received and the response given in the text is logged 254. The app process repeats sending survey questions and receiving responses from the user until the user stops responding or the final survey question is sent out 256.

Figure 4:
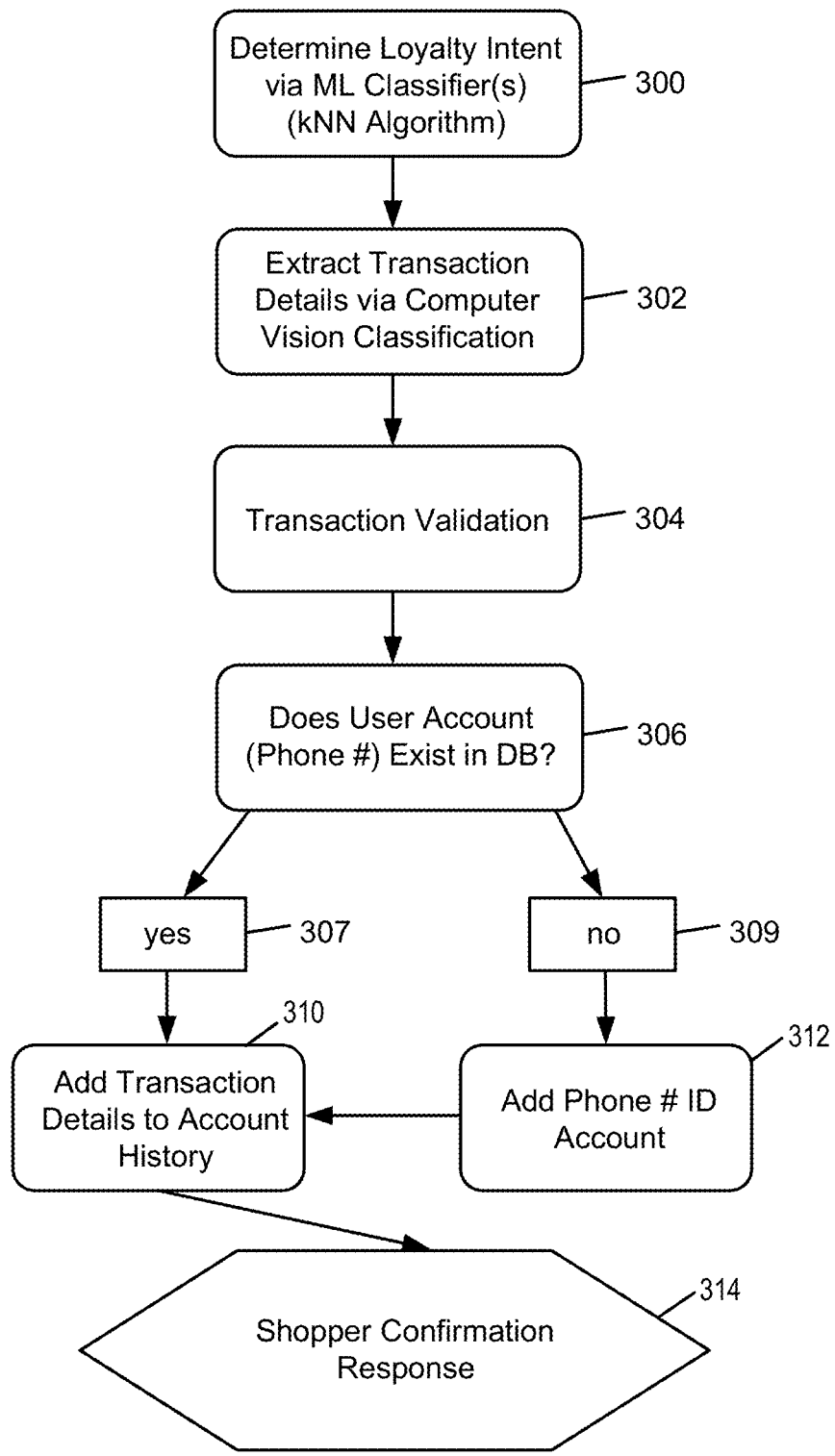
FIG. 4 is a flowchart of a program corresponding to a loyalty program intent for use in the intelligent interface of FIG. 1.

Loyalty programs can be enabled or particularly enhanced by the text messaging intelligent interface 100. Referring now to FIG. 4, a loyalty program app shall now be described. The intent classifier 112 determines that a user request should activate the loyalty intent 300. A particularly useful way to activate the loyalty intent is for the user to snap a photo of his or her customer receipt and forward the photo by a text to the establishment's phone number used by the intelligent interface 100. In a preferred embodiment, that phone number may be a landline phone number associated with the establishment.

In order to facilitate photo activation of a corresponding app, the intent classifier should be configured to include image recognition. For example, the intent classifier could begin its analysis of a request by determining if the request contains visual data. If yes, an image recognition technique can be activated to classify the image or video. For purposes of the loyalty app of FIG. 4, a determination is made as to whether the visual data is a receipt. One available technique for evaluating visual data is to vectorize the image to translate the image format into one that can be evaluated algorithmically for a match. Scikit learn's kNN algorithm is one of the readily available programs for image recognition.

When the intent classifier 112 recognizes a receipt, the loyalty intent has been determined 300. The loyalty app then calls upon optical character recognition ("OCR") 160. Transaction details are extracted from the receipt photo using the optical character recognition 302. A transaction validation process is initiated 304. Transaction validation can be performed in the intelligent interface or in communication with a third party application through a third party application interface 170. The application may be found in, for example, a loyalty program provider or a system of the client. Communications are typically exchanged through the IP Network Interface 110 over the IP network. The loyalty program app initiates an inquiry to the loyalty database to determine if the user's phone number identifies a valid loyalty program account 306. If the account is found 307, the transaction details are added to the account history 310. If the account is not found 309, the phone number is added as a new account 312. Alternatively, validation can be conducted in the intelligent interface, by for example, performing format/layout matching of the merchant's proof of purchase receipt. Indeed, the loyalty program itself can be hosted and stored at the intelligent interface without reliance upon a third party loyalty program provider. The transaction details are saved to a history for the new account. A response is sent back to the user to confirm that these actions were taken 314.

Figure 5:
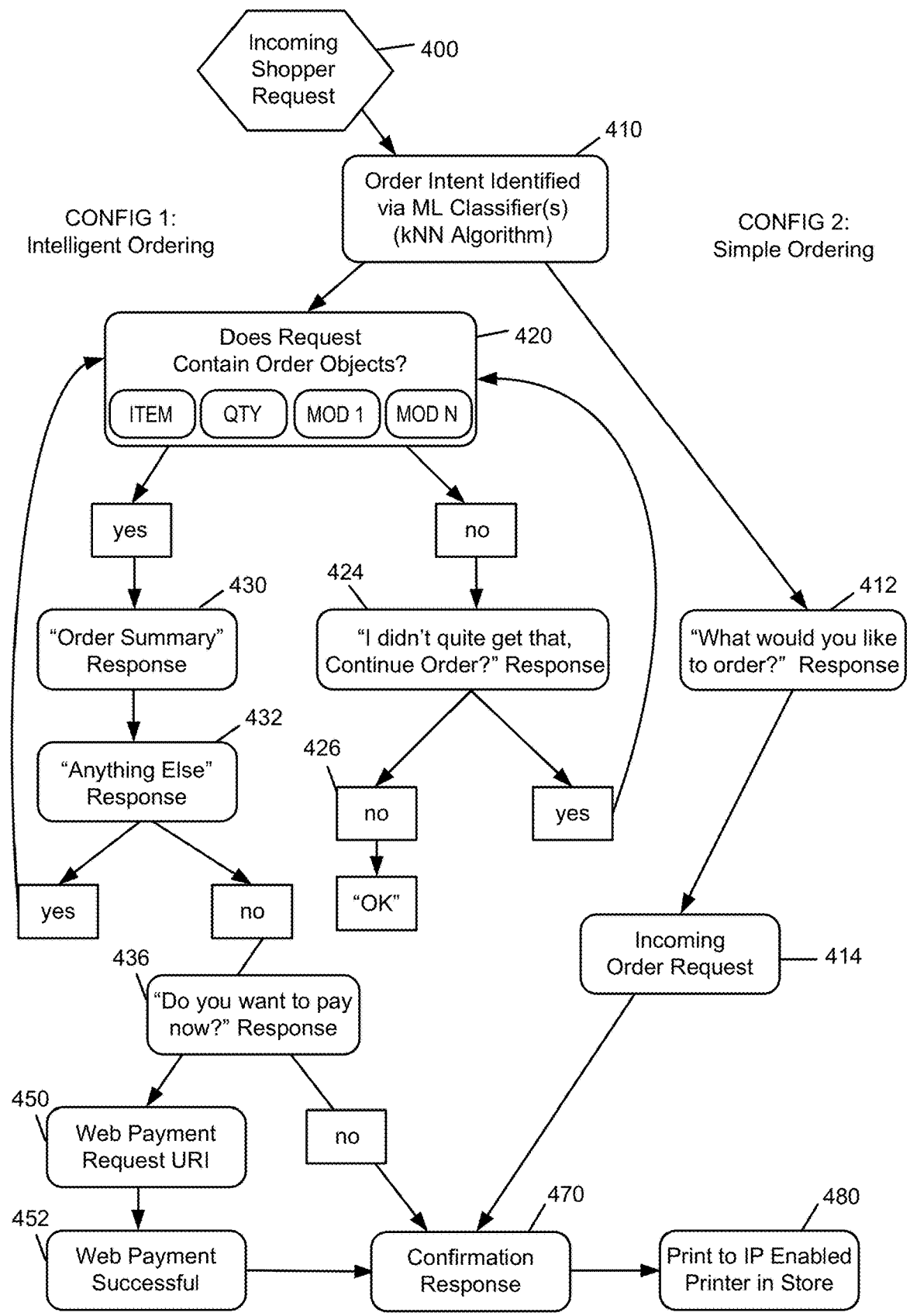
FIG. 5 is a flowchart of a program corresponding to an order taking intent for use in the intelligent interface of FIG. 1.

Referring now to FIG. 5, a flow for two related intents is shown. The intent classifier 112 receives an incoming shopper request 400. When the intent classifier identifies 410 the request as a simple ordering request, the response generator will produce a corresponding inquiry for use as the response. The simple ordering intent calls for a response of "what would you like to order?" 412. Upon receipt of the user's order request 414, a confirmation response is transmitted to the user 470 and the order as texted by the user is sent through a third party application interface 170 to the client establishment where the order can be printed 480. Thus, a user is able to transmit an order via text message to a store, and in some cases, that text message can be addressed to the store's landline phone number.

If the intent classifier 112 identifies the request as an intelligent ordering intent, the object classifier 114 is prompted by the ordering app to determine if the request contains the needed information specifying the item, quantity and any modifications to the item being ordered 420. If any of the information is missing, the app causes a message to be generated requesting the needed information. (not shown) If the app cannot discern an order of an item from the request, it can send a request indicating its lack of comprehension. For example, a response reading "I didn't quite get that, continue order?" response can be sent to the user 424. The user can choose to give up and discontinue the order 426. Alternatively, the user can try sending an order with a next text message. The app will then try to read the new order text message to determine if it can identify an item to be ordered from the order objects 420.

When the information for an item has been obtained, the ordering app sends a request summarizing the order 430 and asking if the user wishes to order any other items 432. If yes, the process repeats itself to complete the ordering information for this next item. If the user is done ordering items, the user may be asked "Do you want to pay now?" 436. If not, a confirmation response 470 can be generated. The confirmation response preferably includes a listing of the items ordered. If the user is going to pay, the ordering app generates, based on the items ordered, and delivers a payment request URI 450. The request is sent in a reply to the user, arriving at the user's text messaging device via text. If a payment processing program, such as Apple Pay or Google Pay, is present natively on the user's device then user follows the pay workflow dictated by their app. If user's device lacks such a payments app, user is presented with a payment detail input page in a web browser, so that the user can enter his or her credit card information. The web payment is processed to determine if payment is accepted. Upon successful payment 452, a confirmation response 470 can be sent in a reply to the user. The ordering app can then initiate a communication to the client store with the order information that is to be filled by the store for the customer identified by the phone number of the user. The order may be printed at an IP enabled printer in the store 480.

Figure 6:
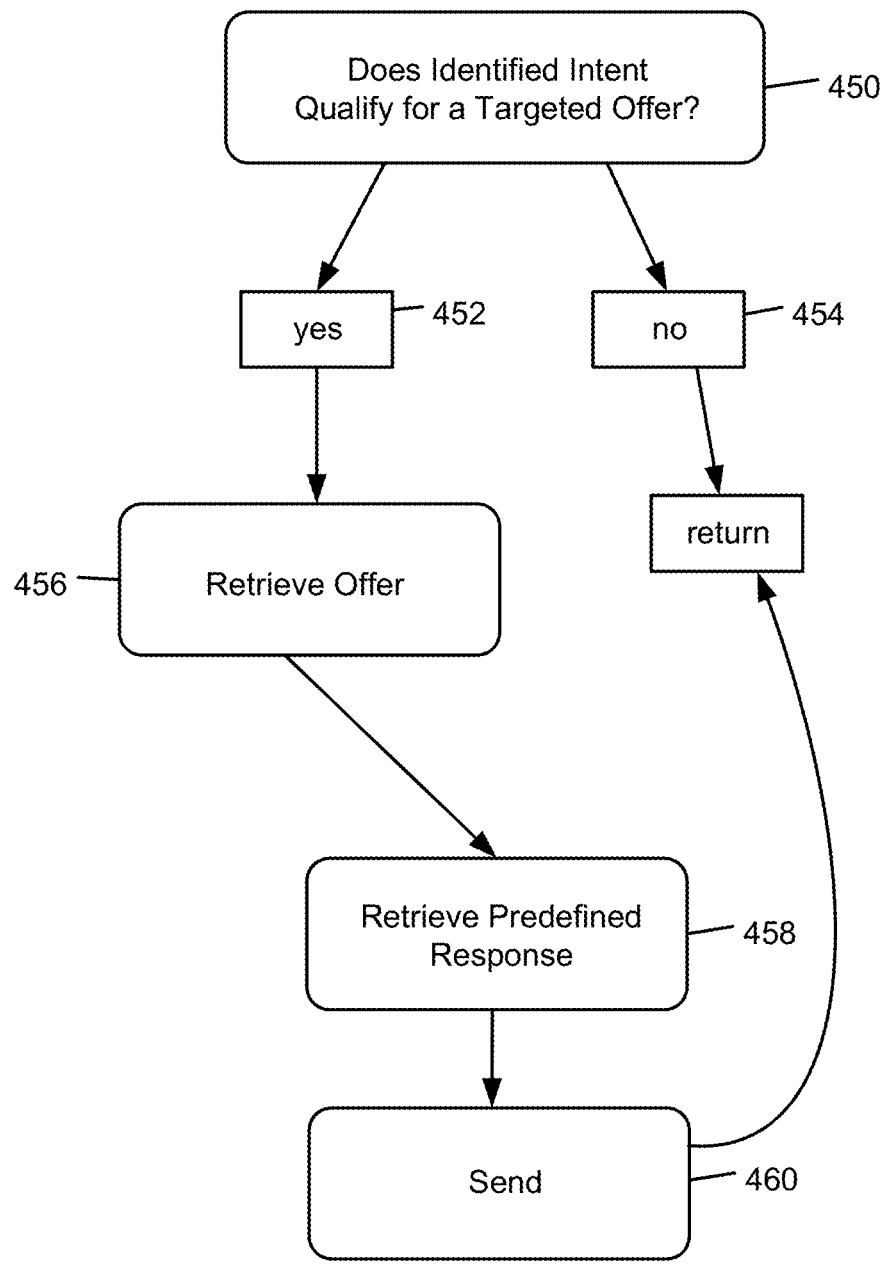
FIG. 6 is a flowchart of a targeted offer program for use in the intelligent interface of FIG. 1.

The intelligent interface 100 can provide additional services on top of the intents requested by a user. For example, a client may wish to make targeted offers to users engaged in text communications with the intelligent interface. A targeted offer program is illustrated in flow chart format in FIG. 6. For a client who has signed up for the targeted offer program, the response generator 116 will call the targeted offer program upon learning of the intent identification from the intent classifier. A decision block 450 determines if a targeted offer is applicable to the intent. Some intents may not qualify for targeted offers. Other intents certainly do qualify for a targeted offer. Still other intents might qualify depending upon object classification. In this latter case, decision block 450 awaits object classification before finally determining whether a targeted offer should be retrieved and sent. If the identified intent does not qualify for a targeted offer 454, the response generator 116 returns to the program for the original intent 455. The program for the intent can then proceed to send 460 its response back to the user in a reply.

If the identified intent does qualify 452, the offer applicable to the intent and/or object is retrieved 456 from among the stored app data 128. A predefined response is retrieved for use in a reply 458. The flow returns to the program for the original intent 455. According to the needs of the system and/or the client, the predefined response for the offer may be sent out ahead of the intent reply, sent out along with the intent reply or sent after the intent reply. The program for the intent can handle the send accordingly 460.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-alone hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. The embodiments of the invention described above are intended to be merely exemplary; numerous variations and modifications will be apparent to those skilled in the art. All such variations and modifications are intended to be within the scope of the present invention as defined in any appended claims.

What is claimed is:

1. An intelligent interface responsive to text messages, each having a source phone number, message content and a destination number, the interface comprising:
    an IP network interface associated with a plurality of client establishment phone numbers, wherein the IP network interface is configured to receive a request including at least the following data obtained from one of the text messages—the source phone number, the message content, and one of the client establishment phone numbers as the destination number;
    a reply generator wherein the reply includes the source phone number as a destination, the one of the client establishment phone numbers as a source and a generated response, wherein a session between the source phone number and the one of the client establishment phone numbers includes a series of requests and replies; and
    a third party application interface configured to communicate with the one of the client establishments responsive to the session.

2. The intelligent interface of claim 1 wherein the third party application interface is configured to communicate a paid order through the IP network interface to the one of the client establishments responsive to a session that takes an order from the source phone number.

3. The intelligent interface of claim 1 further comprising:
    a first vectorizer;
    a memory for storing a serialized intent file created by the first vectorizer;
    an intent classifier connected to receive the message content from the IP network interface and to determine, based on the message content, one intent from the serialized intent file; and
    a response generator that creates the generated response to the one intent.

4. The intelligent interface of claim 3 further comprising a second vectorizer in communication with a collection of intent object attributes, the second vectorizer configured to create a serialized intent object file.

5. The intelligent interface of claim 3 wherein the intent classifier is responsive to message content including a purchase receipt image to determine an intent corresponding to a loyalty program.

6. A method for centrally responding to text messages addressed to any of a plurality of client establishment phone numbers, each text message having a source phone number, message content and destination phone number, the method comprising:
    (a) receiving a request over an IP network including the source phone number, the destination phone number and the message content from one of the text messages, wherein the destination phone number is one of the client establishment phone numbers;
    (b) generating a response message content in response to the message content;
    (c) transmitting a reply over the IP network including the source phone number as a destination, the one of the client establishment phone numbers as a source and the response message content;
    (d) repeating steps (a) through (c) so as to conduct a messaging session; and
    (e) communicating via a third-party application interface with the one of the client establishments responsive to the messaging session.

7. The method of claim 6, wherein the client establishment phone number corresponds to a landline.

8. The method of claim 6 wherein the message content of at least one of the requests in the session includes order information and the act of generating is further responsive to an ordering app.

9. The method of claim 8 further comprising generating message content including a web payment URI.

10. The method of claim 9 wherein the act of communicating comprises sending a paid order through the IP network to the one of the client establishments.

11. The method of claim 6 further comprising receiving a text message over a cellular network and converting the text message to the request that is received over the IP network.

12. The method of claim 11 further comprising receiving the reply over the IP network and forwarding the response message content in a text message to the destination.

13. The method of claim 6 further comprising forwarding the response message content as a text message to the destination.

14. A system for handling text messages, each text message having a source phone number, message content and destination phone number, the system comprising:
    a plurality of client establishments each having a client establishment phone number;
    an intelligent interface including an intent classifier;
    a gateway in communication with a cellular network and the IP network, the gateway configured to convert cellular network communications to IP network communications and IP network communications to cellular network communications, said gateway further configured to intercept any text message sent over the cellular network that has one of the client establishment phone numbers as its destination phone number and to send the source phone number, message content and destination phone number in a request to the intelligent interface over the IP network; and
    wherein the intelligent interface is configured to receive the request over the IP network and to transmit to the gateway a reply over the IP network including the source phone number as a destination, the one of the client establishment phone numbers as a source and a response message content generated in response to the message content,
    wherein a session between the source phone number and the one of the client establishment phone numbers includes a series of requests and replies, and wherein the intelligent interface further includes a third party application interface configured to communicate with the one of the client establishments responsive to the session.

15. The system of claim 14 wherein the gateway is further configured to extract the destination, the source and the response message content from the reply and send a text message with the extracted data to the source phone number.

16. The system of claim 14 wherein the intelligent interface further includes an ordering app that generates response message content including a web payment URI.

17. The system of claim 16 wherein the third party application interface is configured to send a paid order through the IP network to the one of the client establishments.

18. The system of claim 14, wherein the one of the client establishment phone numbers is a landline phone number.

* * * * *